United States Patent [19]

Masse

[11] Patent Number: 5,266,648
[45] Date of Patent: Nov. 30, 1993

[54] ONE PHASE MELT RADIAL POLYMER

[75] Inventor: Michael A. Masse, Richmond, Tex.

[73] Assignee: Shell Oil Company, Houston, Tex.

[21] Appl. No.: 766,252

[22] Filed: Sep. 27, 1991

[51] Int. Cl.$^5$ .......................................... C08F 297/04
[52] U.S. Cl. ..................................... 525/314; 525/901
[58] Field of Search ........................ 525/314; 526/21

[56] References Cited

U.S. PATENT DOCUMENTS

| | | | |
|---|---|---|---|
| 3,985,137 | 10/1976 | Donohue | 128/303.17 |
| 3,985,830 | 10/1976 | Fetters et al. | 526/21 |
| 4,108,945 | 8/1978 | Fetters et al. | 260/880 B |
| 4,136,137 | 1/1979 | Hsieh et al. | 428/462 |
| 4,180,530 | 12/1979 | Bi et al. | 525/98 |
| 4,359,551 | 11/1982 | Suda et al. | 524/271 |
| 4,409,357 | 10/1983 | Milkovich | 524/505 |
| 4,868,245 | 9/1989 | Pottick et al. | 525/314 |
| 4,882,384 | 11/1989 | Willis et al. | 525/314 |

FOREIGN PATENT DOCUMENTS

| | | |
|---|---|---|
| 715645 | 5/1974 | Canada . |
| 0197774 | 10/1986 | European Pat. Off. . |
| 0311430 | 4/1989 | European Pat. Off. . |
| 0366486 | 5/1990 | European Pat. Off. . |
| 87/03606 | 6/1987 | PCT Int'l Appl. . |
| 89/10378 | 3/1989 | PCT Int'l Appl. . |

OTHER PUBLICATIONS

L.-K. Bi and L. J. Fetters, Macromolecules 9 732 (1976).

Monica Olvera de la Cruz and Isaac Sanchez, "Theory of Microphase Separation in Graft and Star Copolymers:", Macromolecules 19 2501–2509 (1986).

J. T. Korberstein, T. P. Russell, D. J. Walsh, and L. Pottick; "Microphase Separation Transition of a Triblock Copolymer" Macro-Molecules 23 877–881 (1990).

Primary Examiner—Paul R. Michl
Assistant Examiner—Edward Cain
Attorney, Agent, or Firm—James O. Okorafor

[57] ABSTRACT

A symmetric star block copolymer having and exhibiting one phase melt behavior comprising from about 3 to 30 arms, wherein each of said arm has a molecular weight of from about 20,000 to 35,000; said arms coupled with a suitable coupling agent; and wherein said arms comprises monomers of monoalkenyl aromatic hydrocarbon and conjugated diolefins; and wherein said monoalkenyl aromatic hydrocarbon is present in an amount of from about 20 to 40 wt % of the star block copolymer. Also disclosed is a process for preparing these one phase melt block copolymers.

20 Claims, No Drawings

ONE PHASE MELT RADIAL POLYMER

FIELD OF THE INVENTION

This invention generally relates to coupled radial polymers. More particularly, the invention relates to certain coupled radial polymers which have and exhibit one phase melt behavior, and to a process for the preparation of such polymers.

BACKGROUND OF THE INVENTION

The preparation of block copolymers is well known. In a synthetic method an initiator compound is used to start the polymerization of one monomer. The reaction is allowed to proceed until all of the monomer is consumed resulting in a living homopolymer. To this living homopolymer is added a second monomer which is chemically different from the first. The living end of the first polymer serves as the site for continued polymerization, thereby incorporating the second monomer as a distinct block into the linear polymer. The block polymer so grown is living until terminated.

Termination converts the living end of the block copolymer into a non-propagating species, thereby rendering the polymer unreactive toward monomer or coupling agent. A polymer so terminated is commonly referred to as a diblock copolymer. Alternately, the living block copolymers can be reacted with multifunctional condensing agents commonly referred to as coupling agents. Coupling of the living ends results in radial polymer having at least two arms.

This synthetic approach allows the construction of materials of great practical utility. When the two blocks are sufficiently dissimilar they will not mix but will be microphase separated. This condition is to be distinguished from ordinary phase separation in that the two dissimilar materials are connected through chemical bonds. As such the two blocks become segregated but are not allowed to migrate away from each other. This microphase separated condition may persist in both the solid and melt states. When radial polymers possess such dissimilar blocks which are rubbery and glassy a full range of material characteristics can be achieved, from thermoplastic elastomeric to impact toughened thermoplastic. If the central block is rubbery and the endblocks are glassy then the useful rubbery character of these materials arises from the constrained nature of the rubbery chains. Each end of the rubbery block is anchored in a glassy block. As a result mechanical energy is elastically stored in rubber chain extension when the material is subjected to a bulk deformation.

Since this microphase separated condition commonly exists in both the solid and melt states of radial block copolymers, a mechanism for elastically storing energy exists even in melts. In this case the melt has a significant elastic character. Thus, while the microphase separated state is the feature which gives the solid its useful properties, it also contributes to sometimes exceedingly high melt viscosities. In general, this leads to high energy costs for block copolymer melt processing. In limiting cases, block copolymers alone cannot be melt processed but must have processing aids such as oils and thermoplastic resins incorporated in order to be handled in melt processing equipment. Further the phase separated nature of the material in conjunction with the high viscosities makes melt compounding of these block copolymers with other components difficult. Poor degrees of mixing can result. It is these problems that the present invention addresses.

Recent theoretical work has outlined the thermodynamics controlling the microphase separated character of block copolymers. The thermodynamics disclosures are limited to discussions on generic block copolymer molecules. According to the thermodynamic theory, the state of the block copolymer, microphase separated or homogeneous, is determined by a combination of four variables: the chemical types of the constituent blocks and the resulting thermodynamic interaction between them, the molecular weights of the blocks, the relative amounts of the blocks, and the temperature. Any one variable alone is not sufficient to describe the thermodynamic state of the block copolymer and thereby its resulting morphology and mechanical behavior. The three material variables and temperature must be specified in order to determine the block copolymer's thermodynamic state. A discovery of this invention is the specification of these variables for radial block copolymers of monoalkenyl aromatic hydrocarbons and conjugated diolefins.

SUMMARY OF THE INVENTION

It is an object of the present invention to provide a symmetric star block copolymer of monoalkenyl aromatic hydrocarbon and conjugated diolefin monomers which have and exhibit one phase melt behavior.

It is also an object of this invention to provide a process for the production of one phase melt block copolymers of monoalkenyl aromatic hydrocarbons and conjugated diolefins.

Accordingly, it is now provided a symmetric star block copolymer comprising monomers of monoalkenyl aromatic hydrocarbons and conjugated diolefin wherein the monoalkenyl aromatic hydrocarbon is present in an amount of from about 20 to 40 wt %, the molecular weight of a single arm is from 20,000 to 35,000; the arms being present in a range of from 3-30; and wherein the arms are coupled with a suitable coupling agent.

Furthermore, it is also provided a process for the production of one phase melt block copolymers of monoalkenyl hydrocarbons and conjugated diolefins comprising polymerizing monomers of monoalkenyl hydrocarbon then adding monomers of conjugated diolefins and polymerizing to form a living diblock copolymer, then adding a suitable coupling agent. The copolymer so produced has the characteristics outlined in the preceding paragraph.

DETAILED DESCRIPTION OF THE INVENTION

Generally speaking, the materials useful in the practice of this invention include a monovinyl aromatic hydrocarbon, a conjugated diene, an initiator, a coupling agent, and a suitable solvent.

Still generally speaking, the process of this invention involves dissolving a monovinyl aromatic monomer in a suitable solvent, and polymerizing the monomer with the aid of an initiator. A conjugated diene (or other suitable olefin) monomer is then added, and polymerization is allowed to continue to completion to form a living diblock copolymer. Following this, a coupling agent is introduced to condense the individual diblock copolymers into radial structures.

In a broad sense, all monovinyl aromatic hydrocarbon monomers are useful in the practice of this invention. These compounds are exemplified by styrene or styrene derivatives inclusive of p-methyl styrene, p-ethyl styrene, and t-butyl styrene. Styrene is the preferred member of this group.

As a component of the inventive product, the monovinyl aromatic compound is present in an amount within the range of from about 20 to 40 weight percent, preferably 25 to 35 wt %, and most preferably in an amount within the range of from about 28 to 30 weight percent. Furthermore, the molecular weight of the monovinyl aromatic block as a component of the inventive product ranges from about 5,000 to about 11,000. A preferred molecular weight range is from about 6,000 to 10,000, while from about 7,000 to 9,000 is particularly preferred.

The conjugated diene is usually used as the second block of the diblock copolymer. Suitable dienes are those capable of polymerizing ionically. Such dienes are exemplified by 1,3-butadiene and isoprene. The preferred diene is 1,3-butadiene.

The conjugated diene component of the inventive product ranges from about 60 to 80 weight percent. While a range of from about 65 to 75 wt % is preferred, a range of from about 70 to 72 wt % is most preferred. This conjugated diene component has a molecular weight ranging from about 15,000 to 30,000, preferably from about 18,000 to 27,000, and most preferably from about 20,000 to 25,000.

It is to be noted that the block molecular weights herein described are true molecular weights. These are to be distinguished from molecular weights referenced to a chemically or structurally dissimilar reference polymer such as obtained from linear polystyrene standardized gel permeation chromatography when the polymer to be tested is not linear polystyrene.

The medium for conducting the polymerization reaction is a usually purified aprotic organic solvent. Examples of such solvents are cyclic hydrocarbons such as benzene and cyclohexane or linear or branched alkanes such as pentane, hexane, heptane, octane, or isopentane and the like. Mixtures of these solvents are also suitable. Preferably, a cyclic hydrocarbon is used. Most preferably cyclohexane is used.

Initiation of polymerization is achieved by using an organometallic compound suitable for anionic polymerization and soluble in the reaction medium. Preferred among such compounds are alkyl lithium compounds such as methyl lithium, n-butyl lithium, and sec-butyl lithium. Most preferred is sec-butyl lithium. The ratio of initiator to monovinyl aromatic compound is chosen to yield a suitable molecular weight.

The coupling agents used to condense the living block copolymer arms into symmetric radial structures are multifunctional compounds susceptible to nucleophilic attack such as silicon halides, organo-silicon halides, divinyl aromatic compounds, and multifunctional esters, isocyanates and epoxides. Typically the type of coupling agent is chosen to build a radial structure of well controlled architecture. Silicon halides, organo-silicon halides, and divinyl aromatic compounds are more preferred. Most preferred are dimethyl-dichlorosilane, methyl-trichlorosilane, tetrachloro-silane, 1,2-bis(trichloro-silyl)ethane, and 1,6-bis(trichloro-silyl)hexane.

The quantity of coupling agent used is an amount that is sufficient to yield a complete coupling reaction. Quantitatively stated, this amount may range in the ratio of 1:1 of reactive sites on the coupling agent to living chain end. In practice, amounts in the ratios of about 0.9:1 and 0.95:1 have been used satisfactorily.

To accelerate the coupling reaction, an accelerating agent(s) may be employed. These agents are usually polar compounds and are essentially aprotic. Examples of these agents include aromatic ethers, linear alkyl ethers, and cycloalkyl ethers. Particularly preferred accelerating agents are ortho-dimethoxy-benzene, glyme, and diglyme. When employed, these accelerating agents are added in an amount within the range of from about 100 to 1000 ppm based on the amount of the total solution. Amounts in the range of from about 200 to 500 ppm are preferred.

These block copolymers are prepared by a three step process. In the first step the monovinyl aromatic compound which is dissolved in a purified organic solvent is polymerized using an initiating agent. In general, the initiating agent must begin a reaction mechanism which is capable of forming block copolymers. In practice the initiating agents known to form block copolymers operate by forming a reactive ionic species capable of propagation. The reaction is allowed to proceed until the monovinyl aromatic compound is entirely incorporated into the polymer. In the second step a conjugated diene or other suitable olefin is added to the solution in a batchwise fashion. Polymerization is allowed to proceed until the second monomer is completely incorporated. At this point a living diblock copolymer is formed. In the third step a multifunctional coupling agent is added to condense the individual diblock copolymers into radial structures. To expedite this step a compound capable of accelerating the coupling reaction may also be added.

The polymer prepared by the process disclosed herein is a radial block copolymer. The polymer can be particularly and distinctly described by specifying the chemical identity of the blocks, the relative amounts of the blocks in each arm and the molecular weight of those arms. These three variables, considered together, describe a polymer which possesses the character of low melt viscosities by virtue of its homogeneity at elevated temperatures.

More precisely described, the inventive block copolymer in addition to other features herein disclosed comprises preferably of from 3 to 12 arms, most preferably from 4 to 8 arms, the arms each having a preferred molecular weight of from about 25,000 to 30,000; and most preferably from about 27,000 to 29,000. The inventive block copolymer contains as a preferred amount 25-35 wt % of the monovinyl aromatic hydrocarbon, with 28 to 30 wt % being most preferred.

The blocks comprising the polymer become miscible at temperatures below the typical processing temperatures, and most importantly, below the thermal degradation temperature of either block or coupling linkage. In the same polymer the blocks also become immiscible at room temperature. The inventive radial block copolymer has inter alia the following advantages over prior art polymers: it is useful as a thermoplastic elastomer at room temperature. It also has and exhibits improved processing characteristics, and can be readily compounded in the melt.

The following examples and tables further illustrate the various aspects of this invention.

EXAMPLE 1

235.3 g of pure cyclohexane were added to a 500 ml septa-capped bottle under nitrogen. 9.2 g of pure styrene monomer was added to the solvent. The impurities in this solution were scavenged by addition of 7.17 mg of sec-butyl lithium. Polymerization was initiated by addition of 73.5 mg of sec-butyl lithium. The polymerizing mixture was stirred at 50° C. for 30 minutes. 20.8 g of pure butadiene was added and the reaction was allowed to stir for an additional 120 minutes. Coupling was then performed by adding 59.3 g of 1,6-bis(trichloro silyl)hexane dropwise over a 1-2 minute period. 54.8 g of ortho-dimethoxybenzene, an accelerator, was added immediately after the coupling agent. The coupling reaction was allowed to proceed at 50° C. for 120 minutes after which the reaction was terminated by addition of 24.6 mg of dry methanol.

Approximately 30 g of polymer was obtained after precipitation of the polymer in an excess of stirred isopropyl alcohol at room temperature. The 6-armed polymer was determined to have a total molecular weight of 173,500. Styrene made up to 27.3% by weight of the polymer. The 6-armed polymer made up 91.0% of the sample with 7.0% being uncoupled styrene-butadiene arms of molecular weight 28,900 and 1.5% being homopolystyrene of molecular weight 7,900.

EXAMPLE 2

213.7 g of pure cyclohexane were added to a 500 ml septa-capped bottle under nitrogen. 8.9 g of pure styrene monomer was added to the solvent. The impurities in this solution were scavenged by addition of 16.1 mg of sec-butyl lithium. Polymerization was initiated by addition of butyl lithium. Polymerization was initiated by addition of 91.4 mg of sec-butyl lithium. The polymerizing mixture was stirred at 50° C. for 30 minutes. 2.0 g of pure butadiene was added and the reaction was allowed to stir for an additional 120 minutes. Coupling was then performed by adding 82.4 mg of 1,6-bis(trichloro silyl)hexane dropwise over a 1-2 minute period. The coupling reaction was allowed to proceed at 50° C. for 45 hours after which the reaction was terminated by addition of 12.3 mg of dry methanol.

Approximately 30 g of polymer was obtained after precipitation of the polymer in an excess of stirred isopropyl alcohol at room temperature. The 6-armed polymer was determined to have a total molecular weight of 129,000. Styrene made up 28.8% by weight of the polymer. The 6-armed polymer made up 87.2% of the sample with 10.0% being uncoupled styrene-butadiene arms of molecular weight 21,500 and 1.4% being homopolystyrene of molecular weight 5,100.

EXAMPLE 3

240.0 g of pure cyclohexane were added to a 500 ml septa-capped bottle under nitrogen. 8.9 g of pure styrene monomer was added to the solvent. The impurities in this solution were scavenged by addition of 7.17 mg of sec-butyl lithium. Polymerization was initiated by addition of 60.0 mg of sec-butyl lithium. The polymerizing mixture was stirred at 50° C. for 30 minutes. 20.8 g of pure butadiene was added and the reaction was allowed to stir for an additional 120 minutes. Coupling was then performed by adding 49.7 g of 1,6-bis(trichloro silyl)hexane dropwise over a 1-2 minute period. 54.8 g of ortho-dimethoxybenzene was added immediately after the coupling agent. The coupling reaction was allowed to proceed at 50° C. for 120 minutes after which the reaction was terminated by addition of 24.6 mg of dry methanol.

Approximately 29 g of polymer was obtained after precipitation of the polymer in an excess of stirred isopropyl alcohol at room temperature. The 6-armed polymer was determined to have a total molecular weight of 202,100. Styrene made up 27.0% by weight of the polymer. The 6-armed polymer made up 88.4% of the sample with 7.9% being uncoupled styrene-butadiene arms of molecular weight 33,700 and 1.8% being homopolystyrene of molecular weight 9,100.

EXAMPLE 4

226.9 g of pure cyclohexane were added to a 500 ml septa-capped bottle under nitrogen. 8.4 g of pure styrene monomer was added to the solvent. The impurities in this solution were scavenged by addition of 8.06 mg of sec-butyl lithium. Polymerization was initiated by addition of 93.2 mg of sec-butyl lithium. The polymerizing mixture was stirred at 50° C. for 30 minutes. 20.9 g of pure butadiene was added and the reaction was allowed to stir for an additional 120 minutes. Coupling was then performed by adding 62.4 g of tetrachlorosilane dropwise over a 1-2 minute period. 54.8 g of ortho-dimethoxybenzene were added immediately after the coupling agent addition as an accelerator. The coupling reaction was allowed to proceed at 50° C. for 120 minutes after which the reaction was terminated by addition of 24.6 g of dry methanol.

Approximately 29 g of polymer was obtained after precipitation of the polymer in an excess of stirred isopropyl alcohol at room temperature. The 4-armed polymer was determined to have a total molecular weight of 92,800. Styrene made up 29.2% by weight of the polymer. The 4-armed polymer made up 94.2% of the sample with 3.7% being uncoupled styrene-butadiene arms of molecular weight 23,200 and 1.5% being homopolystyrene of molecular weight 5,800.

EXAMPLE 5

246.3 g of pure cyclohexane were added to a 500 ml septa-capped bottle under nitrogen. 8.2 g of pure styrene monomer was added to the solvent. The impurities in this solution were scavenged by addition of 6.90 mg of sec-butyl lithium. Polymerization was initiated by addition of 94.1 mg of sec-butyl lithium. The polymerizing mixture was stirred at 50° C. for 30 minutes. 2.7 g of pure butadiene was added and the reaction was allowed to stir for an additional 120 minutes. Coupling was then performed by adding 62.4 g of tetrachlorosilane dropwise over a 1-2 minute period. The coupling reaction was allowed to proceed at 50° C. for 48 hours after which the reaction was terminated by addition of 24.6 g of dry methanol.

Approximately 30 g of polymer was obtained after precipitation of the polymer in an excess of stirred isopropyl alcohol at room temperature. The 3-armed polymer was determined to have a total molecular weight of 79,100. Styrene made up 27.3% by weight of the polymer. The 3-armed polymer made up 93.7% of the sample with 4.5% being uncoupled styrene-butadiene arms of molecular weight 26,400 and 1.4% being homopolystyrene of molecular weight 6,900.

EXAMPLE 6

255.3 g of pure cyclohexane were added to a 500 ml septa-capped bottle under nitrogen. 8.4 g of pure styrene monomer was added to the solvent. The impurities in this solution were scavenged by addition of 5.38 mg of sec-butyl lithium. Polymerization was initiated by addition of 64.8 mg of sec-butyl lithium. The polymerizing mixture was stirred at 50° C. for 30 minutes. 22.1 g of pure butadiene was added and the reaction was allowed to stir for an additional 120 minutes. Coupling was then performed by adding 43.0 g of tetrachlorosilane dropwise over a 1-2 minute period. The coupling reaction was allowed to proceed at 50° C. for 48 hours after which the reaction was terminated by addition of 24.6 g of dry methanol.

Approximately 30 g of polymer was obtained after precipitation of the polymer in an excess of stirred isopropyl alcohol at room temperature. The 3-armed polymer was determined to have a total molecular weight of 113,000. Styrene made up 27.6% by weight of the polymer. The 3-armed polymer made up 84.6% of the sample with 5.9% being uncoupled styrene-butadiene arms of molecular weight 37,700 and 2.6% being homopolystyrene of molecular weight 10,000.

EXAMPLE 7

192.9 g of pure cyclohexane were added to a 500 ml septa-capped bottle under nitrogen. 8.6 g of pure styrene monomer was added to the solvent. The impurities in this solution were scavenged by addition of 8.06 mg of sec-butyl lithium. Polymerization was initiated by addition of 70.8 mg of sec-butyl lithium. The polymerizing mixture was stirred at 50° C. for 30 minutes. 21.7 g of pure butadiene was added and the reaction was allowed to stir for an additional 120 minutes. Coupling was then performed by adding 65.1 g of dichloro-dimethylsilane dropwise over a 1-2 minute period. 54.8 g of orthodimethoxybenzene were added immediately after the coupling agent addition as an accelerator. The coupling reaction was allowed to proceed at 50° C. for 120 minutes after which the reaction was terminated by addition of 24.6 g of dry methanol.

Approximately 29 g of polymer was obtained after precipitation of the polymer in an excess of stirred isopropyl alcohol at room temperature. The 2-armed polymer was determined to have a total molecular weight of 61,000. Styrene made up 28.8% by weight of the polymer. The 2-armed polymer made up 80.3% of the sample with 11.2% being uncoupled styrene-butadiene arms of molecular weight 30,500 and 2.8% being homopolystyrene of molecular weight 7,900.

TABLE I

| | | Molecular Description of Polymers | | | |
|---|---|---|---|---|---|
| Polymer ID | Number of arms | Sytrene MW | Butadiene MW | 1,2-butadiene addition (%) | Styrene wt % |
| 6A | 6 | 5,100 | 16,400 | 9.3 | 28.8 |
| 6B | 6 | 6,000 | 16,700 | 8.3 | 29.6 |
| 6C | 6 | 7,900 | 21,000 | 7.9 | 28.7 |
| 6D | 6 | 8,500 | 23,700 | 8.2 | 27.9 |
| 6E | 6 | 9,100 | 25,200 | 8.2 | 28.2 |
| 6F | 6 | 9,100 | 24,600 | 8.1 | 28.1 |
| 4A | 4 | 5,800 | 17,400 | 8.3 | 27.9 |
| 3A | 3 | 6,900 | 19,500 | 8.2 | 26.2 |
| 3B | 3 | 10,000 | 27,700 | 8.1 | 26.6 |

TABLE I-continued

| | | Molecular Description of Polymers | | | |
|---|---|---|---|---|---|
| Polymer ID | Number of arms | Sytrene MW | Butadiene MW | 1,2-butadiene addition (%) | Styrene wt % |
| 2A | 2 | 7,900 | 22,800 | 7.5 | 28.8 |
| 2B | 2 | 9,100 | 27,200 | 7.6 | 28.3 |
| 2C | 2 | 10,700 | 27,700 | 10.0 | 28.0 |

TABLE II

| | Viscosity of Polymers | | | |
|---|---|---|---|---|
| Polymer ID | $T_{OD}$ (C.) | Complex Viscosity (Pa sec) @ 120° C. | 150° C. | 180° C. |
| 6A | <100 | 4,680 | 846 | 412 |
| 6B | <100 | 7,100 | 1,030 | 480 |
| 6C | 145 | 166,000 | 32,500 | 5,780 |
| 6D | 175 | 403,000 | 172,000 | 36,500 |
| 6E | 195 | 545,000 | 226,000 | 147,000 |
| 6F | 195 | 538,000 | 235,000 | 143,000 |
| 4A | <100 | 5,250 | 1,150 | 450 |
| 3A | <100 | 26,900 | 3,230 | 1,130 |
| 3B | >200 | 766,000 | 264,000 | 141,000 |
| 2A | 140 | 70,200 | 2,630 | 510 |
| 2B | 180 | 149,000 | 83,200 | 8,260 |
| 2C | >200 | 234,000 | 96,600 | 63,300 |

The dynamic viscosity was measured at a shear rate of 0.1 rad/s and at 3% strain amplitude.
$T_{OD}$ is the order-disorder transition temperature which is associated with the transition from separate phases to miscible phases.

The viscosity of these polymers was measured using dynamic mechanical spectroscopy. Importantly, the properties are measured on neat radial polymers. No additives such as thermoplastic resins, oils, solvents, or plasticizers are present in the samples. The disappearance of the melt's microphase separated character is evidenced by an abrupt and significant decrease in both the elastic modulus and viscosity. The temperature at which the microphase separated structure disappears and the melt becomes homogeneous is identified as $T_{OD}$.

The data of Table 11 illustrates the processing advantages of the inventive polymer. The typical processing temperature of butadiene containing polymers is less than 200° C. At and above 200° C. thermally induced crosslinking occurs and initiates polymer degradation. Entry 6F shows the viscosity for a polymer processing of a microphase separated structure up to 195° C. Thus, the viscosity up to 180° C. is greater than 140,000 Pa sec. Entry 6C shows the viscosity of a polymer for which the microphase separated state persists only up to 145° C. Above this temperature a significant reduction in viscosity is apparent when compared to entry 6F. This is attributable to the homogeneous character of the melt above 145° C. Thus, a processing window in which the Polymer 6C relatively possesses low viscosities exists between 145 and 200° C. A similar comparison can be made for entries 2A and 2C. The polymer 2A possesses relatively low viscosities between 140° C. and 200° C. due to one phase melt character.

TABLE III

Mechanical Properties of Styrene-Butadiene Starblock Copolymers (solution cast from toluene)

| Polymer ID | f | $M_{arm}$ | PSC (%) | $T_{OD}$ (1 C.) | $T_g$ (°C.) | tensile toughness in lbf/in³ | strength (psi) | ultimate strain (%) |
|---|---|---|---|---|---|---|---|---|
| 6A | 6 | 21,500 | 28.8 | <100 | 60 | 980 | 350 | 470 |
| 6B | 6 | 22,700 | 29.6 | <100 | 67 | 1650 | 480 | 560 |
| 6C | 6 | 28,900 | 28.7 | 145 | 79 | 8680 | 2300 | 970 |
| 6D | 6 | 32,200 | 27.9 | 175 | 82 | 9120 | 2760 | 930 |

TABLE III-continued

Mechanical Properties of Styrene-Butadiene Starblock Copolymers
(solution cast from toluene)

| Polymer ID | f | $M_{arm}$ | PSC (%) | $T_{OD}$ (1 C.) | $T_g$ (°C.) | tensile toughness in lbf/in³ | tensile strength (psi) | ultimate strain (%) |
|---|---|---|---|---|---|---|---|---|
| 6E | 6 | 34,300 | 28.2 | 195 | 84 | 9765 | 3068 | 950 |
| 6F | 6 | 33,700 | 28.1 | 195 | 86 | 8090 | 2410 | 920 |
| 4A | 4 | 23,200 | 27.9 | <100 | 70 | 2000 | 540 | 610 |
| 3A | 3 | 26,400 | 27.3 | <100 | 81 | 5620 | 1430 | 880 |
| 3B | 3 | 37,700 | 27.6 | >200 | 99 | 4040 | 1280 | 650 |
| 2A | 2 | 30,700 | 28.8 | 140 | 94 | 6630 | 1200 | 650 |
| 2B | 2 | 36,300 | 28.3 | 180 | 100 | 17000 | 3400 | 1340 |
| 2C | 2 | 38,400 | 28 | >200 | 102 | 17500 | 3930 | 1210 |
| 2D | 2 | 43,500 | 27.9 | — | 103 | 18690 | 3930 | 1350 |
| 2E | 2 | 52,100 | 27.6 | — | 108 | 19660 | 4820 | 1310 | f: number of arms in molecule.
PSC: polystyrene content, percentage based on weight.
$T_{OD}$: order-disorder transition temperature.
$T_g$: styrene glass transition temperature.

Although the thermodynamic state is determined by the molecular weight of the arms, the practical utility of the invention as a thermoplastic elastomer is determined by the number of such arms comprising the radial block copolymer. This is illustrated in Table III. For example, the molecules represented by entries 6C and 2A are nearly identical with the exception of the number of arms. Polymer 6C has 6 arms while polymer 2A has 2 arms. The increased number of arms of polymer 6C yields 92% greater strength than polymer 2A. The ultimate strain of 6C which is a direct measure of the extensibility of the elastomer is 970%. Thus, simultaneously increasing the number of arms and adjusting arm molecular weight comonomer type and composition yield polymers which have improved processing character but at the same time retain the useful mechanical properties associated with thermoplastic elastomers.

While this invention has been described in detail for purposes of illustration, it is not to be construed as limited thereby but is intended to cover all changes and modifications within the spirit and scope thereof.

That which is claimed is:

1. A symmetric star block copolymer having and exhibiting one phase melt behavior at temperatures which are below its degradation temperature, comprising from about 3 to 30 arms, wherein each of said arm has a molecular weight of from about 20,000 to 35,000; said arms coupled with a suitable coupling agent; and wherein said arms comprise monomers of monoalkenyl aromatic hydrocarbon and conjugated diolefins; and wherein said monoalkenyl aromatic hydrocarbon is present in an amount of from about 20 to 40 wt % of the star block copolymer.

2. A block copolymer as in claim 1 wherein said monoalkenyl aromatic hydrocarbon monomer is styrene.

3. A block copolymer as in claim 1 wherein said conjugated diolefin is 1,3-butadiene.

4. A block copolymer as in claim 1 wherein said conjugated diolefin is isoprene.

5. A block copolymer as in claim 2 wherein said styrene is present in an amount of from about 25 to 35 wt %.

6. A block copolymer as in claim 5 wherein said styrene has a molecular weight of from about 6,000 to 10,000.

7. A block copolymer as in claim 3 wherein said 1,3-butadiene is present in an amount of from about 65 to 75 wt %.

8. A block copolymer as in claim 7 wherein said 1,3-butadiene has a molecular weight of from about 18,000 to 27,000.

9. A block copolymer as in claim 1 having 3 to 12 arms.

10. A block copolymer as in claim 9 wherein each arm has a molecular weight of from about 25,000 to 30,000.

11. A symmetric star block copolymer having and exhibiting one phase melt behavior at temperatures which are below its degradation temperature, comprising from about 4 to 8 arms, wherein each of said arms has a molecular weight of from about 27,000 to 29,000; said arms coupled with 1,6,bis(trichlorosilyl)hexane; and wherein said arms comprise monomers of styrene and 1,3-butadiene; and wherein said styrene is present in an amount of from about 28 to 30 wt % of the star block copolymer.

12. A block copolymer as in claim 11 wherein said styrene component has a molecular weight of from about 7,000 to 9,000, and said 1,3-butadiene component has a molecular weight of from about 20,000 to 25,000.

13. A process for the preparation of the block copolymer of claim 1 comprising the steps of:
   (a) polymerizing a monovinyl aromatic monomer to form its homopolymer;
   (b) adding to (a) a conjugated diolefin monomer and polymerizing to form a living diblock copolymer; and
   (c) adding a multifunctional coupling agent to condense the product of (b) into radial structures.

14. A process as in claim 13 further comprising the addition of an accelerating agent.

15. A process as in claim 14 wherein said acceleration agent is selected form the group consisting of dimethoxy-benzene, glyme, and diglyme.

16. A process as in claim 13 wherein said monovinyl aromatic monomer is styrene.

17. A process as in claim 13 wherein said conjugated diolefin monomer is a member of the group consisting of 1,3-butadiene and isoprene.

18. A process as in claim 13 wherein said multifunctional coupling agent is selected from the group consisting of silicon halides, organo-silicon halides, and divinyl aromatic compounds.

19. A process as in claim 18 wherein said multifunctional agent is 1,6-bis(trichlorosilyl)hexane.

20. A process as in claim 13 wherein said multifunctional agent is tetrachlorosilane.

* * * * *